United States Patent
Iwai et al.

(10) Patent No.: US 8,077,593 B2
(45) Date of Patent: Dec. 13, 2011

(54) RADIO COMMUNICATION MOBILE STATION DEVICE AND CORRELATION SETTING METHOD

(75) Inventors: Takashi Iwai, Ishikawa (JP); Daichi Imamura, Kanagawa (JP); Tomofumi Takata, Ishikawa (JP); Atsushi Matsumoto, Ishikawa (JP); Yoshihiko Ogawa, Kanagawa (JP); Sadaki Futagi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/672,679

(22) PCT Filed: Aug. 7, 2008

(86) PCT No.: PCT/JP2008/002152
§ 371 (c)(1),
(2), (4) Date: Feb. 10, 2010

(87) PCT Pub. No.: WO2009/019879
PCT Pub. Date: Feb. 12, 2009

(65) Prior Publication Data
US 2010/0273494 A1  Oct. 28, 2010

(30) Foreign Application Priority Data
Aug. 8, 2007 (JP) .................. 2007-207187

(51) Int. Cl.
*H04L 5/04* (2006.01)
(52) U.S. Cl. .................................... 370/204
(58) Field of Classification Search .......... None
See application file for complete search history.

(56) References Cited

U.S. PATENT DOCUMENTS

| | | | |
|---|---|---|---|
| 7,411,894 B2 * | 8/2008 | Ro et al. | 370/203 |
| 2002/0150170 A1 * | 10/2002 | Citta et al. | 375/295 |
| 2007/0291696 A1 * | 12/2007 | Zhang et al. | 370/331 |
| 2008/0112359 A1 * | 5/2008 | Cleveland et al. | 370/329 |
| 2008/0232325 A1 | 9/2008 | Mehta et al. | |
| 2008/0267134 A1 * | 10/2008 | Cheng et al. | 370/335 |
| 2009/0042615 A1 | 2/2009 | Teo et al. | |
| 2009/0042616 A1 | 2/2009 | Teo et al. | |

(Continued)

FOREIGN PATENT DOCUMENTS
EP 1209836 A1 5/2002
(Continued)

OTHER PUBLICATIONS
Fujitsu, "Random Access Preamble from UE in Handover," Report R1-070970, 3GPP TSG RAN WG1 Meeting #48, St. Louis, Feb. 12-16, 2007, pp. 1-4.

(Continued)

*Primary Examiner* — Raj Jain
(74) *Attorney, Agent, or Firm* — Seed IP Law Group PLLC

(57) ABSTRACT

Provided is a radio communication base station device which can suppress a use amount of an SRS communication resource. In this device, a correlation rule setting unit (102) sets a rule for correlating a preamble with an SRS transmission time interval so that the preamble transmission time band and the SRS transmission time band are in the same transmission time band. An SRS transmission band decision unit (103) decides a time interval of a transmission time band which can transmit the SRS according to the preamble transmission time interval inputted from a preamble transmission band decision unit (101) and the correlation rule setting unit (102).

13 Claims, 11 Drawing Sheets

U.S. PATENT DOCUMENTS

| | | | |
|---|---|---|---|
| 2009/0316811 A1 | 12/2009 | Maeda et al. |
| 2010/0034174 A1 | 2/2010 | Nishikawa et al. |
| 2010/0056074 A1 | 3/2010 | Higuchi et al. |
| 2010/0118773 A1 | 5/2010 | Kawamura et al. |

FOREIGN PATENT DOCUMENTS

| | | | | |
|---|---|---|---|---|
| EP | 2139122 | A1 | | 12/2009 |
| JP | 2001-069118 | A | | 3/2001 |
| JP | 2001203663 | A | * | 7/2001 |
| JP | 2005-518760 | A | | 6/2005 |
| JP | 2008177965 | A | | 7/2008 |
| JP | 2008199424 | A | | 8/2008 |
| JP | 2008236427 | A | | 10/2008 |
| JP | 2008289114 | A | | 11/2008 |
| JP | 2009060595 | A | | 3/2009 |
| JP | 2009060596 | A | | 3/2009 |
| JP | 2010510692 | A | | 4/2010 |
| WO | 2008050467 | A | | 5/2008 |

OTHER PUBLICATIONS

International Search Report, mailed Nov. 11, 2008, issued in corresponding International Application No. PCT/JP2008/002152, filed Aug. 7, 2008.

NTT DoCoMo et al., "Necessity of Multiple Bandwidths for Sounding Reference Signals," Report R1-070853, 3GPP TSG RAN WG1 Meeting #48, St. Louis, Feb. 12-16, 2007, pp. 1-10.

NTT DoCoMo et al., "Necessity of Multiple Bandwidths for Sounding Reference Signals," Report R1-072938, 3GPP TSG RAN WG1 Meeting #49bis, Orlando, Florida, Jun. 25-29, 2007, pp. 1-10.

NEC Group and NTT DoCoMo, "Discussion on Uplink Reference Signal," Report R1-072824, 3GPP TSG RAN WG1 Meeting #49bis, Orlando, Florida, Jun. 25-29, 2007, 4 pages.

Texas Instruments, "Improved Non-Synchronized Random Access Structure for E-UTRA," Report R1-063213, 3GPP TSG RAN WG1 #47, Riga, Latvia, Nov. 6-10, 2006, pp. 1-3.

Notice of Grounds for Rejection dated May 11, 2010, relating to Japanese Patent Application No. 2009-526342, 4 pages.

"Preamble Based Scheduling Request: a Generic Structure," Texas Instruments, R1-072193, 3GPP TSG RAN WG1 #49, Kobe, Japan, May 7-11, 2007, 6 pages.

"Scheduling Request and DRX," Texas Instruments, R1-071472, 3GPP TSG RAN WG1 #48bis, St. Julians, Malta, Mar. 26-30, 2007, 5 pages.

Extended European Search Report for corresponding EP Application No. 08790409.0, dated Jul. 6, 2011, 13 pages.

Catt, "Uplink Sounding Reference Signals for TDD with Alternative Frame Structure," R1-071879, 3GPP TSG RAN WG1 LTE Ad Hoc, Beijing, China, Apr. 17-20, 2007, 3 pages.

Nokia, Nokia Siemens Networks, "UL sounding reference signal for EUTRA TDD," R1-072989, 3GPP TSG RAN WG1 Meeting #49bis, Orlando, USA, Jun. 25-29, 2007, 2 pages.

Samsung, "Sounding RS Multiplexing in E-UTRA UL—Interaction with PUCCH," R1-073092, 3GPP TSG RAN WG1 Meeting #49bis, Orlando, FL, USA, Jun. 25-29, 2007, 4 pages.

Panasonic, "Sounding RS multiplexing with RACH and PUCCH for E-UTRA uplink," R1-073629, TSG RAN WG1 Meeting #50, Athens, Greece, Aug. 20-24, 2007, pp. 1-2.

Panasonic, "Sounding RS position and relation with PUCCH," R1-074903, TSG RAN WG1 Meeting #51, Jeju, Korea, Nov. 5-9, 2007, pp. 1-4.

* cited by examiner

RADIO COMMUNICATION MOBILE STATION DEVICE AND CORRELATION SETTING METHOD

TECHNICAL FIELD

The present invention relates to a radio communication base station apparatus and an association setting method.

BACKGROUND ART

The 3GPP RAN LTE (Long Term Evolution) is currently studying transmission of SRSs (Sounding Reference Signals) for channel quality estimation (CQI (Channel Quality Indicator) estimation) for frequency scheduling, reception timing detection and transmission power control on uplink from a radio communication mobile station apparatus (hereinafter abbreviated as a "mobile station") to a radio communication base station apparatus (hereinafter abbreviated as a "base station") (e.g. see Non-Patent Document 1).

According to the 3GPP RAN LTE, for example, an SRS is formed with one LB (Long Block) and the time length of the SRS is 71.4 µs including the CP (Cyclic Prefix) and the reference signal. Furthermore, the mobile station transmits SRSs periodically (e.g. at 1-subframe intervals=at 1 ms intervals), according to command from the base station. Furthermore, a plurality of bandwidths, such as 1.25 MHz, 5 MHz and 10 MHz, are provided for the SRS transmission bandwidth, and a bandwidth corresponding to the propagation condition of the mobile station is set. For example, a mobile station located at a cell edge where the propagation condition is poor and transmission power is limited does not have power necessary to transmit a wideband SRS, and so the mobile station transmits a narrowband (e.g. 1.25 MHz) SRS. When such a narrowband SRS is used, wideband CQI estimation is performed over a plurality of transmission time fields by performing frequency hopping.

Furthermore, the 3GPP RAN LTE is studying the use of random access preamble (hereinafter abbreviated as a "preamble") for initial access of a mobile station, updating of transmission timing and CQI estimation on uplink from a mobile station to a base station (e.g. see Non-Patent Document 2). A preamble is a signal including identification information about a mobile station, and each mobile station randomly selects one of a plurality of code sequences set up in advance by a base station or selects one code sequence according to command from the base station. Each mobile station then transmits a preamble generated based on the selected code sequence to the base station. According to the 3GPP RAN LTE, the preamble is formed with one subframe, for example, and the time length of the preamble is 1 ms (=14 LBs) including the CP, the preamble and the guard time, which is a non-transmission period. Furthermore, the mobile station transmits preambles periodically (e.g. at 10-subframe intervals=10 ms intervals), according to command from the base station as in the case of SRS. Furthermore, for the preamble transmission bandwidth, for example, 1.08 MHz is set (=6 RBs (Resource Blocks)). Furthermore, when the preamble is transmitted, frequency hopping is performed to provide frequency diversity gain and improve the preamble detection performance as in the case of the SRS.

Furthermore, a preamble transmitted from a mobile station which has not established synchronization with a base station on uplink entails a delay matching the round trip propagation delay time (RTD) at reception timing at the time of reception in the base station. Therefore, a guard time is set in the preamble as described above to prevent the preamble from delaying and causing interference with the signal of the next subframe.

When transmitting an SRS, resources of the time domain and frequency domain may be assigned thereto exclusive of other signals (e.g. see Non-Patent Document 3). Here, an SRS is assigned to the first 1 LB in one subframe (=1 ms) of PUSCH (Physical Uplink Shared Channel), which is formed with 14 LBs and assigned transmission data of the mobile station, and transmitted to the base station.

Non-Patent Document 1: NTT DoCoMo, Fujitsu, Mitsubishi Electric, NEC, Panasonic, Sharp, Toshiba Corporation, R1-072938, "Necessity of Multiple Bandwidths for Sounding Reference Signals", 3GPP TSG RAN WG1 Meeting #49bis, Orlando, USA, Jun. 25-29, 2007

Non-Patent Document 2: Texas Instruments, R1-063213, "Improved Non-Synchronized Random Access structure for E-UTRA", 3GPP TSG RAN WG1 Meeting #47bis, Riga, Latvia, Nov. 6-10, 2006

Non-Patent Document 3: NEC Group, NTT DoCoMo, R1-072824, "Discussion on Uplink Reference Signal", 3GPP TSG RAN WG1 Meeting #49bis, Orlando, USA, 25-29 Jun., 2007

DISCLOSURE OF INVENTION

Problems to be Solved by the Invention

However, with the above-described conventional technique of performing transmission by assigning the SRS to the first LB in a subframe, the first LB in a subframe is more frequently used to transmit the SRS as the number of mobile stations in a cell increases. That is, the proportion of communication resources used to transmit SRSs increases as the number of mobile stations in the cell increases. Therefore, according to the above-described conventional technique, when the number of mobile stations within the cell increases, communication resources available for data transmission decrease, and, as a result, the data transmission efficiency is reduced.

It is therefore an object of the present invention to provide a radio communication base station apparatus and an association setting method capable of suppressing the amount of communication resources used for SRSs.

Means for Solving the Problem

The radio communication base station apparatus of the present invention adopts a configuration including a receiving section that receives a first signal which is provide with a guard time and which is transmitted periodically, and a second signal which is transmitted periodically, a setting section that sets an association between the first signal and the second signal such that a first transmission field for the first signal matches a second transmission field for the second signal, and a determining section that determines the second transmission field based on the first transmission field and the association.

Advantageous Effects of Invention

According to the present invention, the amount of communication resources used for SRSs can be reduced.

BEST MODE FOR CARRYING OUT THE INVENTION

Hereinafter, embodiments of the present invention will be explained in detail with reference to the accompanying drawings.

Embodiment 1

Figure 1:
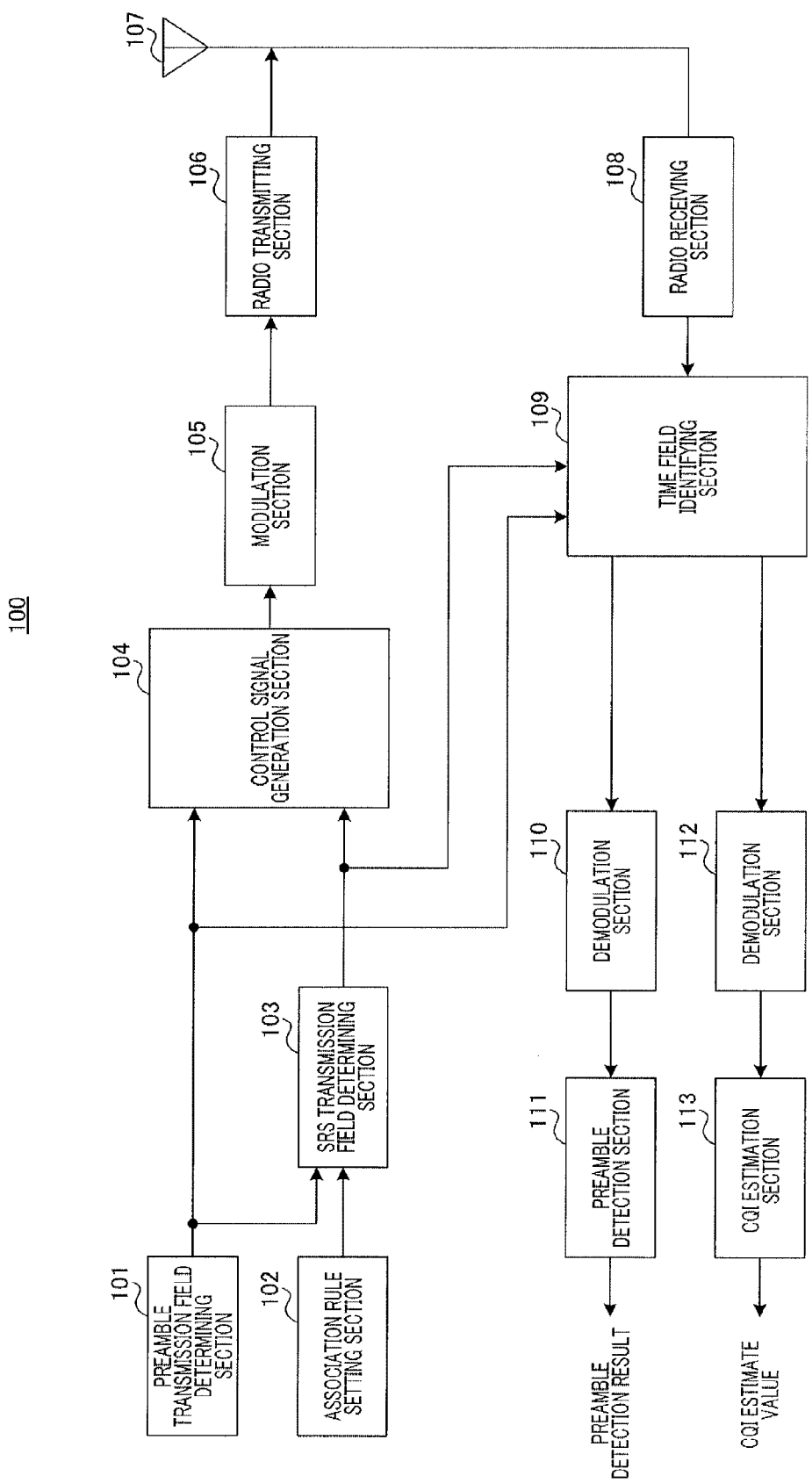
FIG. 1 is a block diagram illustrating a configuration of a base station according to Embodiment 1 of the present invention.

FIG. 1 shows a configuration of base station 100 according to the present embodiment. Base station 100 receives a preamble from mobile station 200 (FIG. 2) which will be described later and receives an SRS from mobile station 300 (FIG. 3) which will be described later.

Preamble transmission field determining section 101 determines the time interval of the transmission time field (subframe) in which the mobile station can transmit a preamble. Preamble transmission field determining section 101 then outputs the determined preamble transmission time interval to SRS transmission field determining section 103, control signal generation section 104 and time field identifying section 109.

Association rule setting section 102 sets rules for associating the transmission time intervals for the preamble and SRS. Association rule setting section 102 then outputs the association rules set, to SRS transmission field determining section 103. Details of the setting of the association rules in association rule setting section 102 will be described later.

SRS transmission field determining section 103 determines the time interval of the transmission time field (subframe) in which the SRS can be transmitted, based on the preamble transmission time interval inputted from preamble transmission field determining section 101 and the association rules inputted from association rule setting section 102. SRS transmission field determining section 103 then outputs the determined SRS transmission time interval to control signal generation section 104 and time field identifying section 109. Details of the processing of determining the SRS transmission time field in SRS transmission field determining section 103 will be described later.

Control signal generation section 104 generates a control signal including the preamble transmission time interval inputted from preamble transmission field determining section 101 and the SRS transmission time interval inputted from SRS transmission field determining section 103. Control signal generation section 104 then outputs the control signal generated to modulation section 105.

Modulation section 105 modulates the control signal inputted from control signal generation section 104 and outputs the modulated control signal to radio transmitting section 106.

Radio transmitting section 106 performs radio processing such as D/A conversion, up-conversion on the control signal and transmits the control signal to mobile station 200 and mobile station 300 via antenna 107.

On the other hand, radio receiving section 108 receives a signal transmitted from mobile station 200 and mobile station 300 via antenna 107, performs radio processing such as down-conversion, A/D conversion on the received signal and outputs the received signal to time field identifying section 109.

Time field identifying section 109 identifies the preamble transmission time field (subframe) and the SRS transmission time field (subframe) based on the preamble transmission time interval inputted from preamble transmission field determining section 101 and the SRS transmission time interval inputted from SRS transmission field determining section 103, outputs the received preamble to demodulation section 110 and the received SRS to demodulation section 112.

Demodulation section 110 demodulates the preamble inputted from time field identifying section 109 and outputs the demodulated preamble to preamble detection section 111.

Preamble detection section 111 determines the correlation between the known preamble code sequence set up in advance in the system and the preamble inputted from demodulation section 110, and detects the preamble. Preamble detection section 111 then outputs a preamble detection result indicating the detected preamble.

Demodulation section 112 demodulates the SRS inputted from time field identifying section 109 and outputs the demodulated SRS to CQI estimation section 113.

CQI estimation section 113 performs CQI estimation based on the SRS inputted from demodulation section 112. CQI estimation section 113 then outputs the estimated CQI estimate value.

Figure 2:
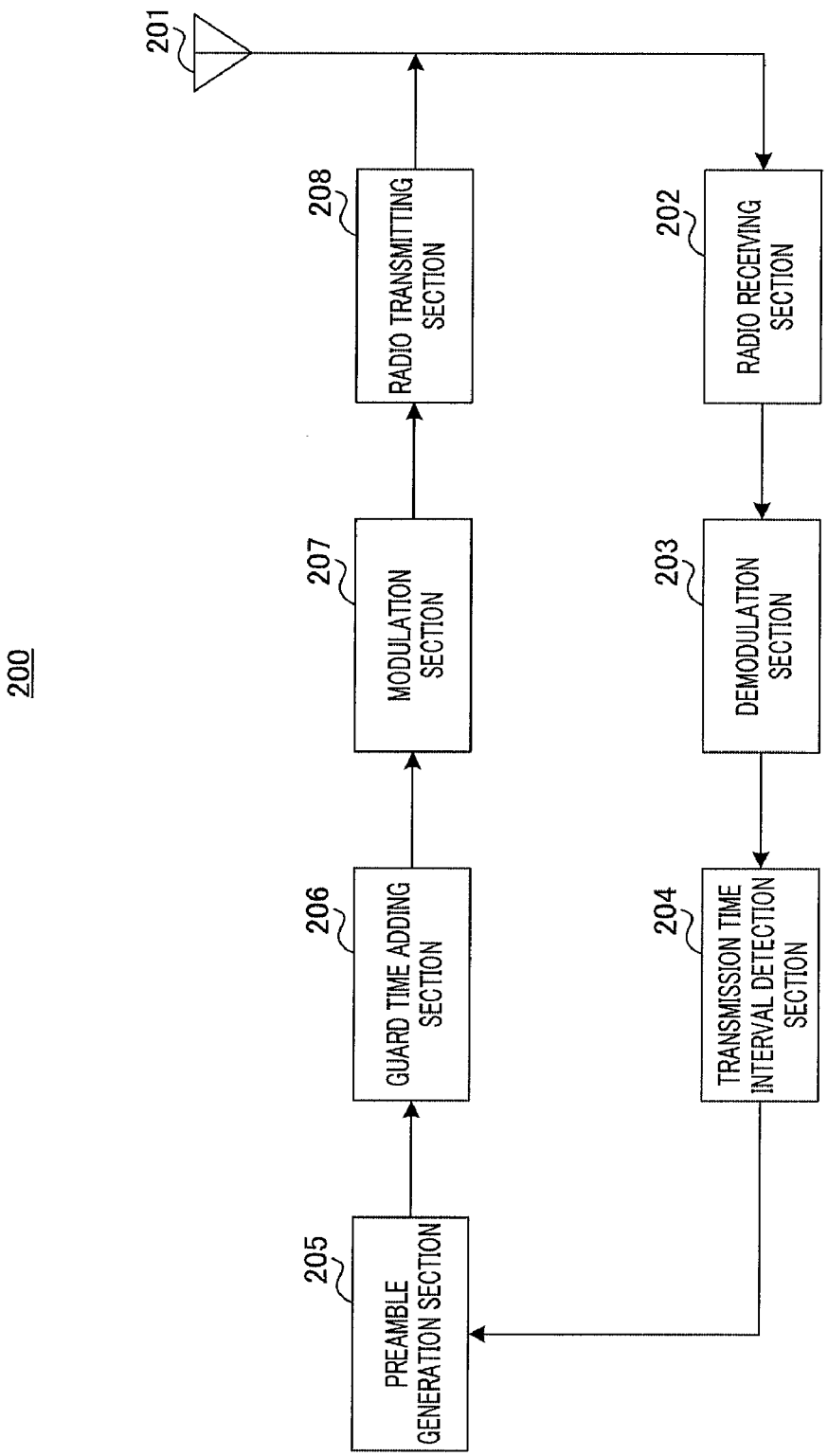
FIG. 2 is a block diagram illustrating a configuration of a mobile station that transmits a preamble according to Embodiment 1 of the present invention.

Next, FIG. 2 shows a configuration of mobile station 200 according to the present embodiment. Mobile station 200 transmits a preamble to base station 100 (FIG. 1).

Radio receiving section 202 receives a control signal transmitted from base station 100 via antenna 201, performs radio processing such as down-conversion, A/D conversion on the control signal and outputs the control signal to demodulation section 203.

Demodulation section 203 demodulates the control signal and outputs the demodulated control signal to transmission time interval detection section 204.

Transmission time interval detection section 204 detects the preamble transmission time interval included in the control signal inputted from demodulation section 203 and outputs the detected preamble transmission time interval to preamble generation section 205.

Preamble generation section 205 randomly selects one preamble code sequence from known preamble code sequences set up in advance in the system in the preamble transmission time field (subframe) obtained based on the preamble transmission time interval inputted from transmission time interval detection section 204. Preamble generation section 205 then generates a preamble based on the selected code sequence. Preamble generation section 205 then outputs the preamble generated to guard time adding section 206.

Guard time adding section 206 adds a guard time of a predetermined time length to the preamble inputted from preamble generation section 205. Guard time adding section 206 then outputs the preamble with a guard time to modulation section 207.

Modulation section 207 modulates the preamble and outputs the modulated preamble to radio transmitting section 208.

Radio transmitting section 208 performs radio processing such as D/A conversion, up-conversion on the preamble inputted from modulation section 207 and transmits the preamble to base station 100 via antenna 201.

Figure 3:
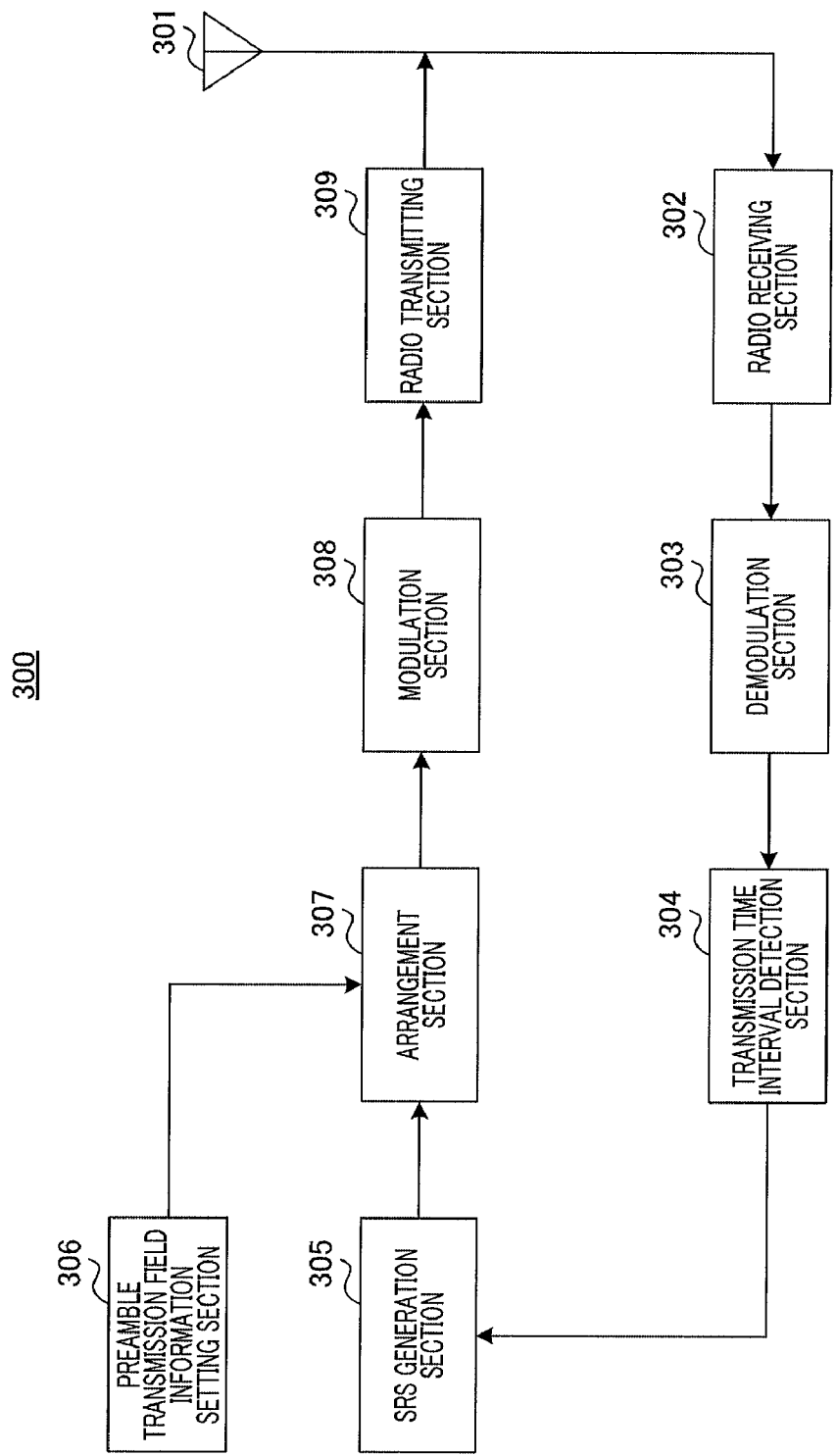
FIG. 3 is a block diagram illustrating a configuration of a mobile station that transmits an SRS according to Embodiment 1 of the present invention.

Next, FIG. 3 shows a configuration of mobile station 300 according to the present embodiment. Mobile station 300 transmits the SRS to base station 100 (FIG. 1).

Radio receiving section 302 receives a control signal transmitted from base station 100 via antenna 301, performs radio processing such as down-conversion and A/D conversion on the control signal, and outputs the control signal to demodulation section 303.

Demodulation section 303 demodulates the control signal and outputs the demodulated control signal to transmission time interval detection section 304.

Transmission time interval detection section 304 detects the SRS transmission time interval included in the control signal inputted from demodulation section 303, and outputs the detected SRS transmission time interval to SRS generation section 305.

SRS generation section 305 generates a known SRS code sequence commanded from base station 100 in advance, in the SRS transmission time field (subframe) obtained based on the SRS transmission time interval inputted from transmission time interval detection section 304. SRS generation section 305 then outputs the generated SRS to arrangement section 307.

Preamble transmission field information setting section 306 sets the positions and time lengths of the CP, preamble and guard time in the preamble transmission time field. Preamble transmission field information setting section 306 then outputs preamble transmission field information indicating the positions and time lengths of the CP, preamble and guard time in the preamble transmission time field, to arrangement section 307.

Arrangement section 307 arranges the SRS in the preamble transmission time field (subframe) based on the preamble transmission field information inputted from preamble transmission field information setting section 306. To be more specific, arrangement section 307 arranges the SRS in the guard time position in the preamble. For example, arrangement section 307 arranges the SRS in the guard time position in the preamble such that the time interval between the preamble and the SRS becomes maximum. Arrangement section 307 outputs the arranged SRS to modulation section 308. Details of the SRS arrangement processing in arrangement section 307 will be described later.

Modulation section 308 modulates the SRS and outputs the modulated SRS to radio transmitting section 309.

Radio transmitting section 309 performs radio processing such as D/A conversion, up-conversion on the SRS inputted from modulation section 308 and transmits the SRS to base station 100 via antenna 301.

Next, details of the setting of the association rules by association rule setting section 102 of base station 100 (FIG. 1), the processing of determining the SRS transmission time interval in SRS transmission field determining section 103 and the processing of SRS arrangement in arrangement section 307 of mobile station 300 (FIG. 3) will be explained.

To be more specific, association rule setting section 102 sets rules according to following equation 1.

$$m \times (\text{preamble transmission time interval}) = n \times (\text{SRS transmission time interval}) \quad \text{(Equation 1)}$$

where m and n are positive integers. That is, association rule setting section 102 sets m and n. By this means, the preamble transmission time field and the SRS transmission time field match in a transmission time field that satisfies equation 1. That is, the preamble and the SRS use the same transmission time field.

Next, SRS transmission field determining section 103 determines the interval of the SRS transmission time field according to the preamble transmission time interval inputted from preamble transmission field determining section 101 and the rules (m and n) set in association rule setting section 102. That is, SRS transmission field determining section 103 determines the SRS transmission time interval from $(m/n) \times$ (preamble transmission time interval) based on equation 1.

This will be explained more specifically below. Here, assuming that the preamble transmission time interval determined in preamble transmission field determining section 101 is 10 subframes, association rule setting section 102 sets m=1 and n=2. Furthermore, suppose the system bandwidth is 24 RBs, the bandwidth for arranging the preamble is 6 RBs and the bandwidth for arranging the SRS is 24 RBs. Furthermore, suppose the time length of the preamble is 1 subframe, and 1 subframe is 14 LBs. Furthermore, suppose the time length of the SRS is 1 LB.

By this means, SRS transmission field determining section 103 determines the SRS transmission time interval to be 5 subframes from (½)×(10 subframes).

Figure 4:
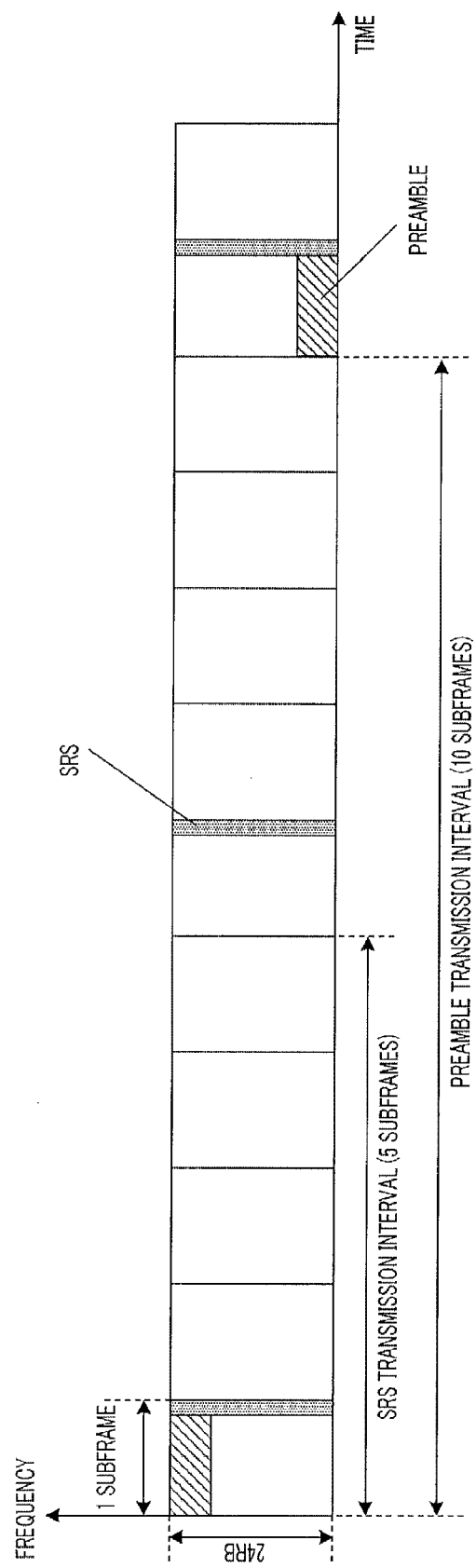
FIG. 4 is a diagram illustrating an association of a transmission time field according to Embodiment 1 of the present invention.

Thus, as shown in FIG. 4, while the time interval of the preamble transmission time field is 10 subframes, the time interval of the SRS transmission time field is 5 subframes. Furthermore, the transmission time field of the preamble, which requires a longer transmission time interval than the SRS, constantly matches the SRS transmission time field. That is, since part of the SRS transmission time field (half of the whole in FIG. 4) is transmitted using the same transmission time field as the preamble transmission time field, communication resources used for the SRS can be reduced.

When one of m and n is 1 in the above equation, the preamble transmission time field constantly matches the SRS transmission time field in the transmission time field for one of the preamble and the SRS having the longer time interval of the transmission time field. On the other hand, when m=n=1, the preamble transmission time field constantly matches the SRS transmission time field, and, consequently, the preamble transmission time field is the only communication resource used for the SRS.

On the other hand, arrangement section 307 of mobile station 300 (FIG. 3) arranges the generated SRS in the position of the guard time in the preamble transmission time field such that the time interval between the preamble and the SRS becomes maximum.

Figure 5:
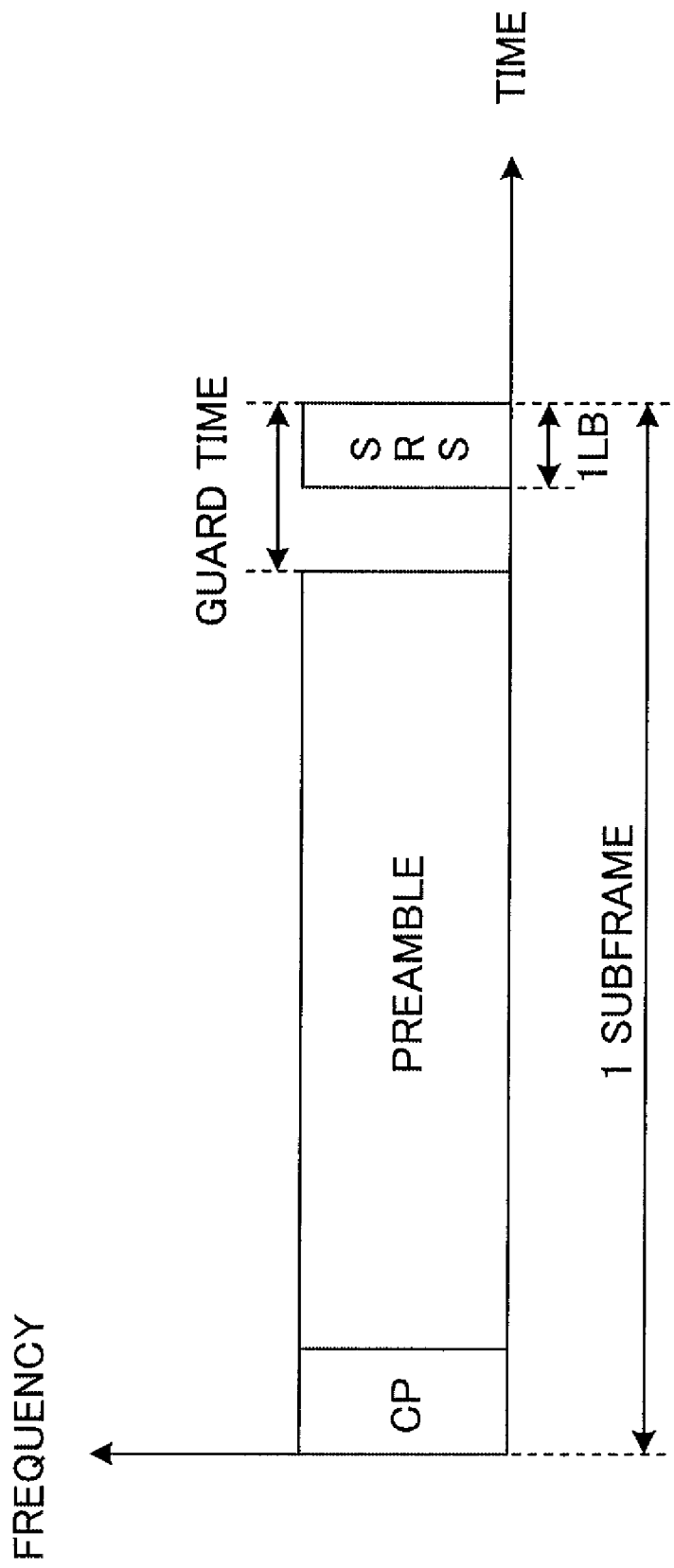
FIG. 5 is a diagram illustrating a preamble transmission time field according to Embodiment 1 of the present invention.

To be more specific, arrangement section 307 arranges the SRS in the guard time of one subframe including the CP, the preamble and the guard time, as shown in FIG. 5. Here, arrangement section 307 arranges the SRS at the tail end of the subframe such that the time interval between the preamble and the SRS becomes maximum as shown in FIG. 5.

Here, the preamble and the SRS shown in FIG. 5 are transmitted from different mobile stations, mobile station 200 (FIG. 2) and mobile station 300 (FIG. 3). Furthermore, uplink synchronization is established between mobile station 300 that transmits the SRS and base station 100, whereas uplink synchronization is not established between mobile station 200 that transmits the preamble and base station 100. That is, since mobile station 300 transmits the SRS taking into account the RTD between mobile station 300 and base station 100, the SRS reception timing in base station 100 is not delayed. On the other hand, since mobile station 200 transmits the preamble without taking into account the RTD, the preamble reception timing in base station 100 is delayed by the RTD.

However, since arrangement section 307 of mobile station 300 arranges the SRS at the tail end of the subframe such that the time interval between the preamble and the SRS becomes maximum, even if the preamble reception timing shown in FIG. 5 delays into the guard time, base station 100 can minimize interference between the preamble and the SRS. Especially when the RTD satisfies following equation 2, no interference occurs between the preamble and the SRS.

$$RTD \leq GT - (CP + SRS) \ldots \quad \text{(Equation 2)}$$

where GT is the time length of the guard time of the preamble transmission time field (subframe), CP is the CP time length of the SRS (value corresponding to delay spread) and SRS is the time length of the SRS.

When, for example, the values determined in the 3GPP RAN LTE are applied to equation 2, RTD≦26 µs. Here, suppose GT=97.4 µs, CP=4.8 µs and SRS=66.6 µs. Furthermore, the RTD increases by 6.67 µs is every time the distance between base station 100 and mobile station 200 increases by 1 km. That is, when the distance between base station 100 and mobile station 200 is equal to or less than approximately 3.9 (=26/6.67) km, no interference occurs between the preamble and the SRS shown in FIG. 5.

Figure 6:
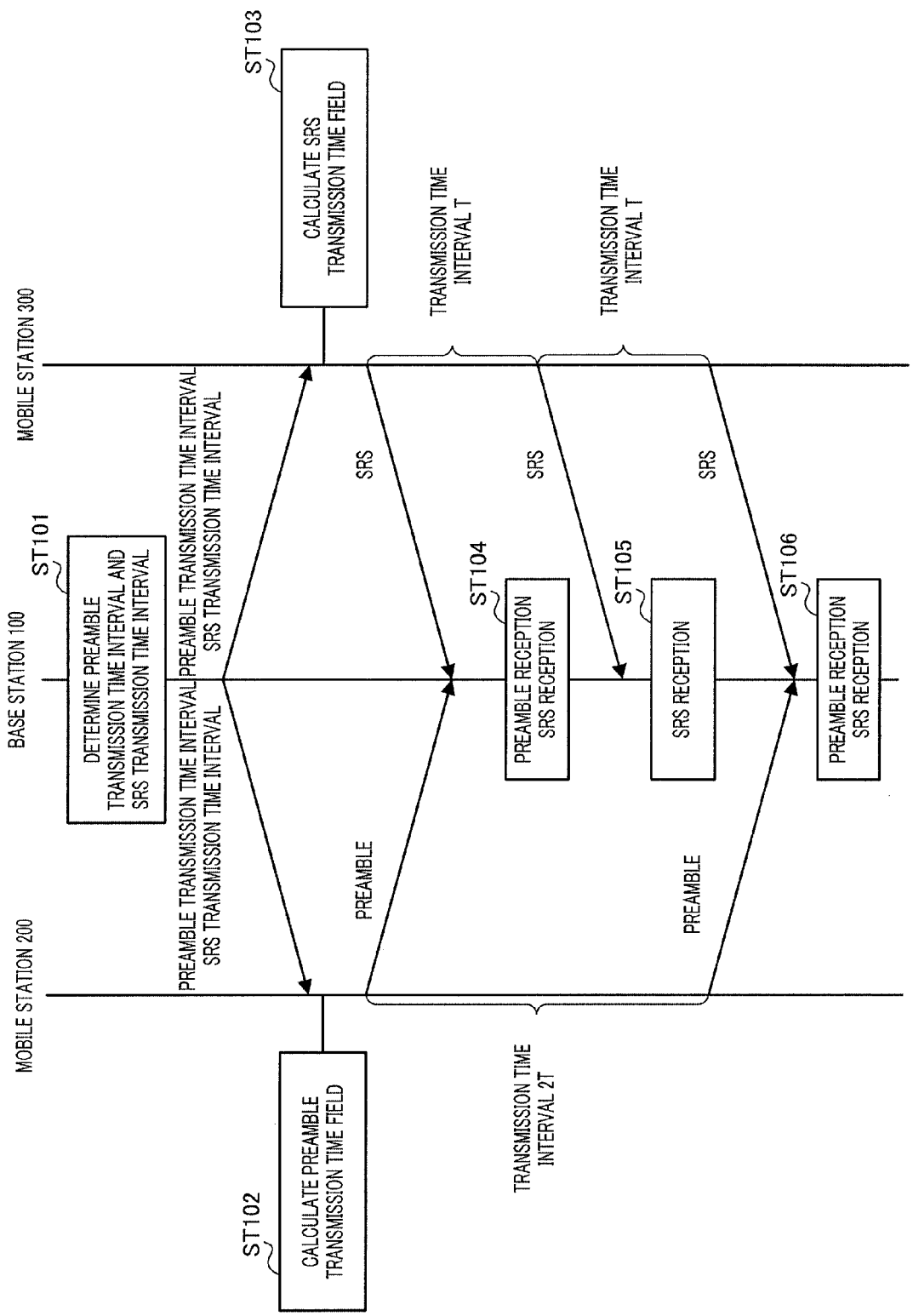
FIG. 6 is an operation sequence of a mobile communication system according to Embodiment 1 of the present invention.

Next, operation of a mobile communication system formed with base station 100, mobile station 200 and mobile station 300 will be explained. FIG. 6 shows an operation sequence of the mobile communication system according to the present embodiment.

In ST 101 (step), preamble transmission field determining section 101 of base station 100 determines the preamble transmission time interval (e.g. 10 subframes shown in FIG. 4) first and SRS transmission field determining section 103 determines the SRS transmission time interval (e.g. 5 subframes shown in FIG. 4). Base station 100 then transmits the preamble transmission time interval and the SRS transmission time interval to mobile station 200 and mobile station 300 respectively.

In ST 102, in mobile station 200 having received the preamble transmission time interval and. SRS transmission time interval, transmission time interval detection section 204 detects the preamble transmission time interval, and preamble generation section 205 calculates the preamble transmission time field and generates a preamble. Mobile station 200 then transmits the preamble to base station 100.

Similarly in ST 103, in mobile station 300 having received the preamble transmission time interval and the SRS transmission time interval, transmission time interval detection section 304 detects the SRS transmission time interval, and SRS generation section 305 calculates the SRS transmission time field and generates an SRS. Furthermore, arrangement section 307 arranges the SRS in the position of the guard time in the preamble transmission time field. Mobile station 300 then transmits the SRS to base station 100.

Next, in ST 104, base station 100 receives the preamble from mobile station 200 and the SRS from mobile station 300 according to the preamble transmission time interval and the SRS transmission time interval reported to mobile station 200 and mobile station 300.

Here, assuming that the SRS transmission time interval (transmission time interval T shown in FIG. 6) is 5 subframes and the preamble transmission time interval (transmission time interval 2T shown in FIG. 6) is 10 subframes, the relational equation of equation 1 above satisfies (preamble transmission time interval)=2×(SRS transmission time interval). That is, while the base station receives a preamble from mobile station 200 one time, the base station receives an SRS from mobile station 300 twice. Furthermore, the preamble transmission time field from mobile station 200 constantly matches the SRS transmission time field from mobile station 300. To be more specific, in transmission time interval T (5 subframes) after base station 100 receives the preamble from mobile station 200 and the SRS from mobile station 300 in ST 104, base station 100 receives only the SRS from mobile station 300 in ST 105. Furthermore, in further transmission time interval T (5 subframes) after ST 105, that is, in transmission time interval 2T (10 subframes) after ST 104, base station 100 receives the preamble from mobile station 200 and SRS from mobile station 300 in ST 106.

Thus, in the preamble transmission time field, not only the preamble but also the SRS is received constantly, and therefore it is possible to reduce the communication resources to be secured for the SRS transmission time field.

Thus, according to the present embodiment, the SRS transmission time interval is associated with the preamble transmission time interval. This allows the SRS transmission time field to match the preamble transmission time field, and therefore it is possible to suppress the amount of communication resources used to transmit the SRS. Furthermore, when the SRS is arranged in the preamble transmission time field, the SRS is arranged in the guard time such that the time interval between the preamble and the SRS becomes maximum, and, therefore, even when the preamble reception timing is delayed, it is possible to minimize interference between the preamble and the SRS.

A case has been described with the present embodiment where the preamble transmission bandwidth (24 RBs) is different from the SRS transmission bandwidth (6 RBs) as shown in FIG. 4, but the preamble transmission bandwidth may be equal to the SRS transmission bandwidth.

Furthermore, a case has been described with the present embodiment where the base station transmits a control signal including an SRS transmission time interval to each mobile station, but it is not necessarily to report the SRS transmission time interval in a control signal to each mobile station. For example, instead of reporting the SRS transmission time interval in a control signal to each mobile station, the base station may report the association rules to each mobile station. By this means, each mobile station can calculate the SRS transmission time interval based on the preamble transmission time interval and the association rules. Furthermore, according to the present embodiment, the entire system may set in advance the association rules. Thus, the base station needs to report only the preamble transmission time interval to each mobile station, and therefore can reduce the amount of information for reporting the SRS transmission time interval and the association rules.

Furthermore, a case has been described with the present embodiment where preamble generation section 205 of mobile station 200 (FIG. 2) generates a preamble based on a preamble code sequence selected randomly from preamble code sequences set up in advance by the system. However, preamble generation section 205 may also generate a preamble based on a preamble code sequence given from base station 100 (FIG. 1). Thus, base station 100 indicates the preamble code sequence to mobile station 200, so that the preamble of mobile station 200 does not collide with the preambles of other mobile stations, and therefore it is possible to prevent collision between the preambles based on the same preamble code sequence.

Furthermore, modulation section 105 (FIG. 1) of base station 100 of the present embodiment, modulation section 207 (FIG. 2) of mobile station 200 and modulation section 308 (FIG. 3) of mobile station 300 may perform DFT (Discrete Fourier Transform) processing, transmission band mapping processing and IFFT (Inverse Fast Fourier Transform) processing. Here, the DFT processing transforms the signal from a time domain signal to a frequency domain signal. Furthermore, the transmission band mapping processing arranges the signal transformed to a frequency domain signal through the DFT processing in a predetermined transmission band. Furthermore, the IFFT processing applies IFFT to the signal subjected to the transmission band mapping processing to transform the signal from a frequency domain signal to a time domain signal.

Likewise, demodulation section 110 and demodulation section 112 of base station 100, demodulation section 203 of mobile station 200 and demodulation section 303 of mobile station 300 may perform FFT (Fast Fourier Transform) processing, transmission band demapping processing and IDFT (Inverse Discrete Fourier Transform) processing. Here, the FFT processing applies FFT to the received signal to transform the signal from a time domain signal to a frequency domain signal. Furthermore, the transmission band demapping processing extracts a predetermined transmission band including the transmitted signal from the signal transformed to the frequency domain. Furthermore, the IDFT processing applies IDFT processing to the signal subjected to the transmission band demapping processing to transform the signal from a frequency domain signal to a time domain signal.

Embodiment 2

In the present embodiment, an SRS is arranged at the beginning of a preamble transmission time field.

Guard time adding section 206 (FIG. 2) of mobile station 200 according to the present embodiment adds a guard time of the same time length as the SRS length before the preamble inputted from preamble generation section 205 and also adds a guard time of a time length corresponding to (1 subframe length−preamble length−SRS length) after the preamble.

On the other hand, when arranging an SRS in a preamble transmission time field (subframe), arrangement section 307 (FIG. 3) of mobile station 300 according to the present embodiment arranges the SRS at the beginning of the preamble transmission time field (subframe).

This will be explained more specifically below. Here, suppose the preamble transmission time field is formed with 14 LBs and the time length of the SRS is 1 LB as with Embodiment 1.

Figure 7:
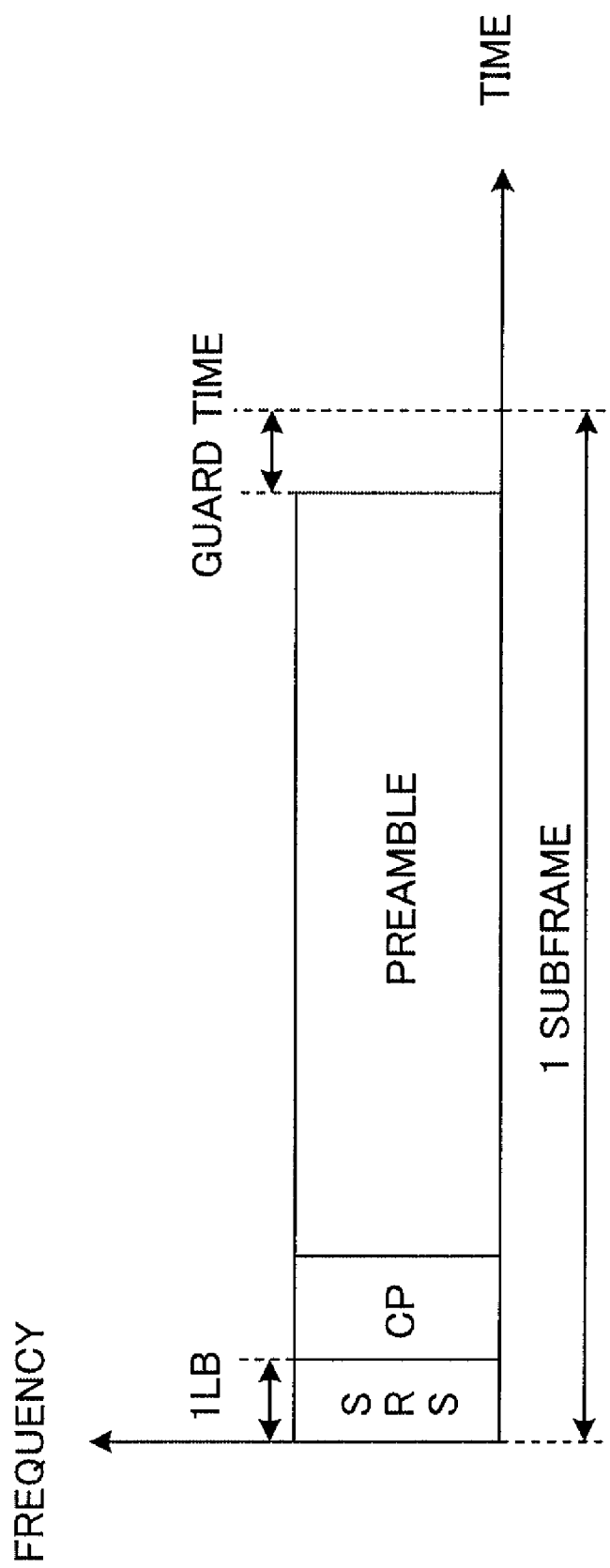
FIG. 7 is a diagram illustrating a preamble transmission time field according to Embodiment 2 of the present invention.

Therefore, as shown in FIG. 7, arrangement section 307 arranges the generated SRS at the beginning of the preamble transmission time field (subframe). On the other hand, mobile station 200 arranges the CP and the preamble directly after the position where the SRS is arranged. That is, as shown in FIG. 7, in mobile station 200, the CP and preamble are arranged in that order from the position 1 LB (i.e. the SRS length) from the beginning of the preamble transmission time field (subframe). Furthermore, as shown in FIG. 7, in 1 subframe, the rest of the transmission time field other than the transmission time field where the SRS and preamble (including the CP) are arranged, constitutes the guard time.

As described above, by this means, the SRS from mobile station 300 does not delay in base station 100. Therefore, even when base station 100 receives a signal with no interval between the SRS and the preamble as shown in FIG. 7, the SRS never slips into the rear part where the preamble is arranged, and therefore the SRS and the preamble do not interfere with each other in the same transmission time field. On the other hand, in base station 100, the preamble is delayed by the RTD. However, as shown in FIG. 7, the present embodiment eliminates the interval between the SRS and the preamble and secures a maximal guard time after the preamble. Therefore, when the RTD satisfies equation 1, base station 100 can prevent interference between the preamble and the signal of the next transmission time field (subframe) as in the case of Embodiment 1.

Thus, according to the present embodiment, the SRS is arranged at the beginning of the preamble transmission time field. This makes it possible to provide similar effects to Embodiment 1 and prevent interference between the SRS and the preamble completely.

Embodiment 3

A case has been described with Embodiment 1 where the preamble and SRS transmission time fields are made to match each other, but a case will be explained now with the present embodiment where the preamble and SRS transmission time fields and the transmission band are made to match each other.

This will be explained more specifically below. In the following explanations, suppose that preambles and SRSs are transmitted using frequency hopping.

Figure 8:
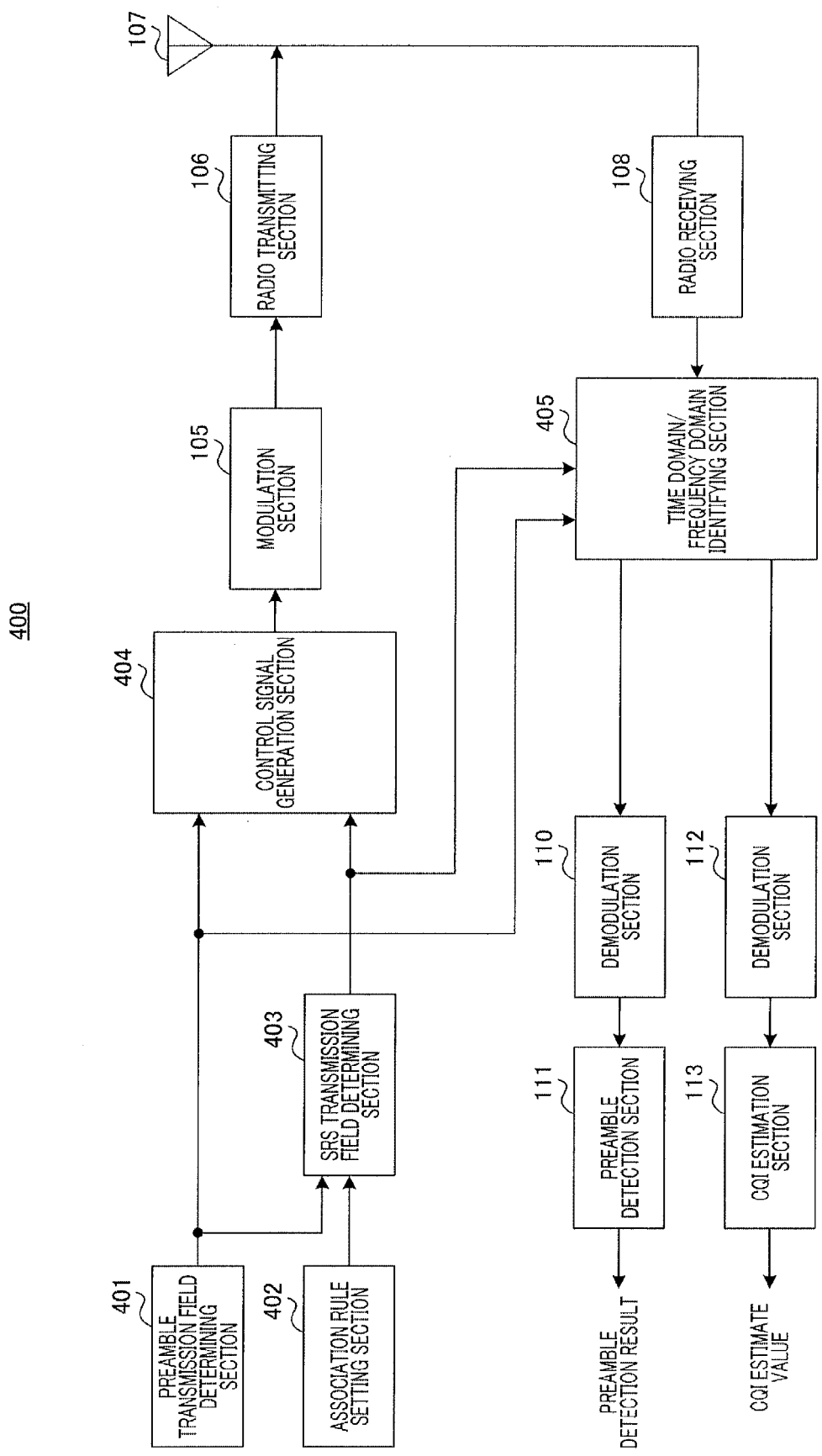
FIG. 8 is a block diagram illustrating a configuration of a base station according to Embodiment 3 of the present invention.

FIG. 8 shows a configuration of base station 400 according to the present embodiment. In FIG. 8, the same components as those in Embodiment 1 (FIG. 1) will be assigned the same reference numerals, and explanations thereof will be omitted.

Preamble transmission field determining section 401 of base station 400 according to the present embodiment determines a time interval (subframe) in which each mobile station can transmit the preamble and a transmission band in which the preamble can be transmitted.

Association rule setting section 402 sets a rule for associating the preamble and SRS transmission time intervals with their transmission bands. Details of the setting of association rules in association rule setting section 402 will be described later.

SRS transmission field determining section 403 determines a time interval (subframe) in which the SRS can be transmitted and a transmission band in which the SRS can be transmitted, based on the preamble transmission time interval and the preamble transmission band inputted from preamble transmission field determining section 401 and the association rules inputted from association rule setting section 402.

Control signal generation section 404 generates a control signal including the preamble transmission time interval and the preamble transmission band inputted from preamble transmission field determining section 401 and the SRS transmission time interval and the SRS transmission band inputted from SRS transmission field determining section 403.

On the other hand, time domain/frequency domain identifying section 405 identifies the transmission time field and the transmission band of the preamble and the SRS based on the preamble transmission time interval and the preamble transmission band inputted from preamble transmission field determining section 401 and the SRS transmission time interval and the SRS transmission band inputted from SRS transmission field determining section 403, outputs the received preamble to demodulation section 110 and the received SRS to demodulation section 112.

Next, the details of the association rule setting in association rule setting section 402 of base station 400 (FIG. 8) and the processing of determining the SRS transmission field in SRS transmission field determining section 403, will be explained.

Here, the preamble transmission time interval determined in preamble transmission field determining section 401 is assumed to be 5 subframes and association rule setting section 402 sets m=1 and n=5. Moreover, suppose the system bandwidth is 24 RBs, the preamble transmission bandwidth is 6 RBs and the SRS transmission bandwidth is 6 RBs. Furthermore, different mobile stations transmit SRS 1 and SRS 2 respectively. Furthermore, both the preamble and the SRS are subjected to frequency hopping whereby the transmission band is changed per transmission time field.

Figure 9:
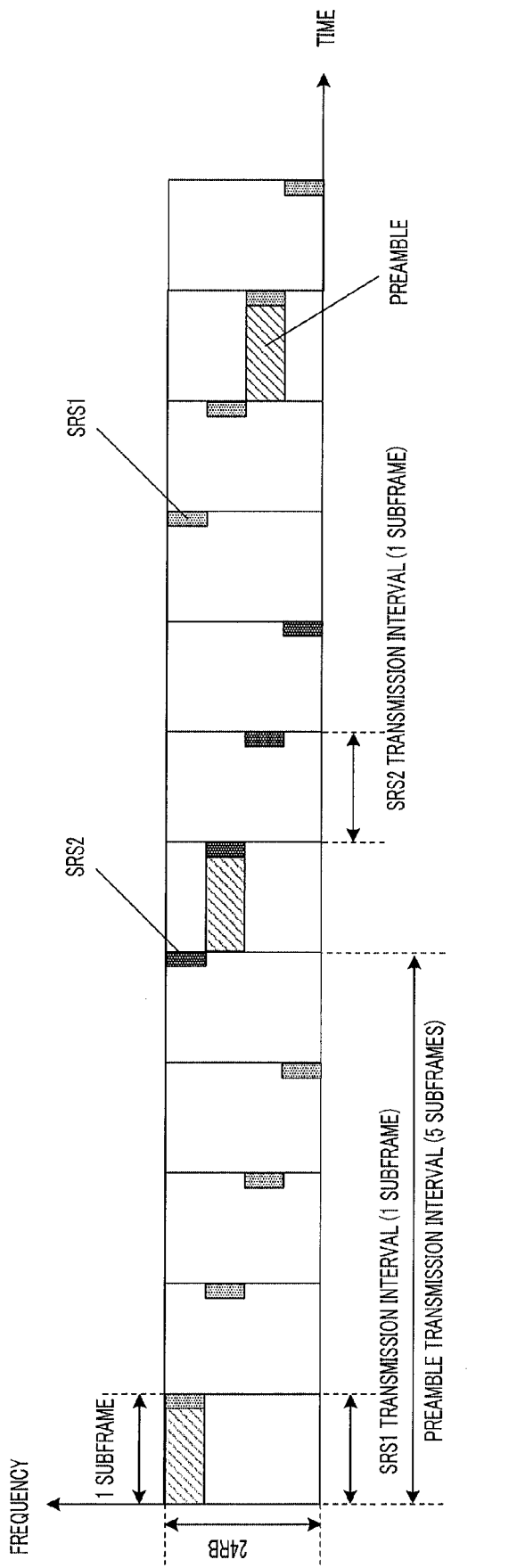
FIG. 9 is a diagram illustrating an association of a transmission time field according to Embodiment 3 of the present invention.

As shown in FIG. 9, association rule setting section 402 sets association rules such that the preamble transmission band matches the SRS transmission band in a transmission time field that satisfies 1×(preamble transmission time interval)=5×(SRS transmission time interval).

Since the preamble transmission time interval inputted from preamble transmission field determining section 401 is 5 subframes, SRS transmission field determining section 403 determines the SRS transmission time interval to be 1 subframe from (m/n)×(preamble transmission time interval), based on equation 1. Furthermore, SRS transmission field determining section 403 determines the transmission band in which the SRS transmission band and the preamble transmission band match, in a transmission time field that satisfies equation 1.

That is, as shown in FIG. 9, the SRS is included in part of the preamble in the preamble transmission time field. By this means, the preamble transmission band can include the preamble and SRS in the preamble transmission time field, and therefore it is possible to assign the remaining transmission band, for example, to PUSCH, for data transmission.

Thus, according to the present embodiment, when a preamble and SRS are subjected to frequency hopping, the preamble transmission band and the SRS transmission band are made to match each other. This makes it possible to maintain a frequency diversity effect through frequency hopping and transmit an SRS in the same transmission time field and the same transmission band as those for a preamble. Therefore, the present embodiment can reduce the communication resources used for SRSs.

A case has been described with the present embodiment where the SRS transmission band is determined such that the SRS frequency hopping pattern matches the preamble frequency hopping pattern in a transmission time field in which the preamble and the SRS match each other. However, according to the present invention, the preamble transmission band may be determined so that the preamble frequency hopping pattern matches the SRS frequency hopping pattern.

Figure 10:
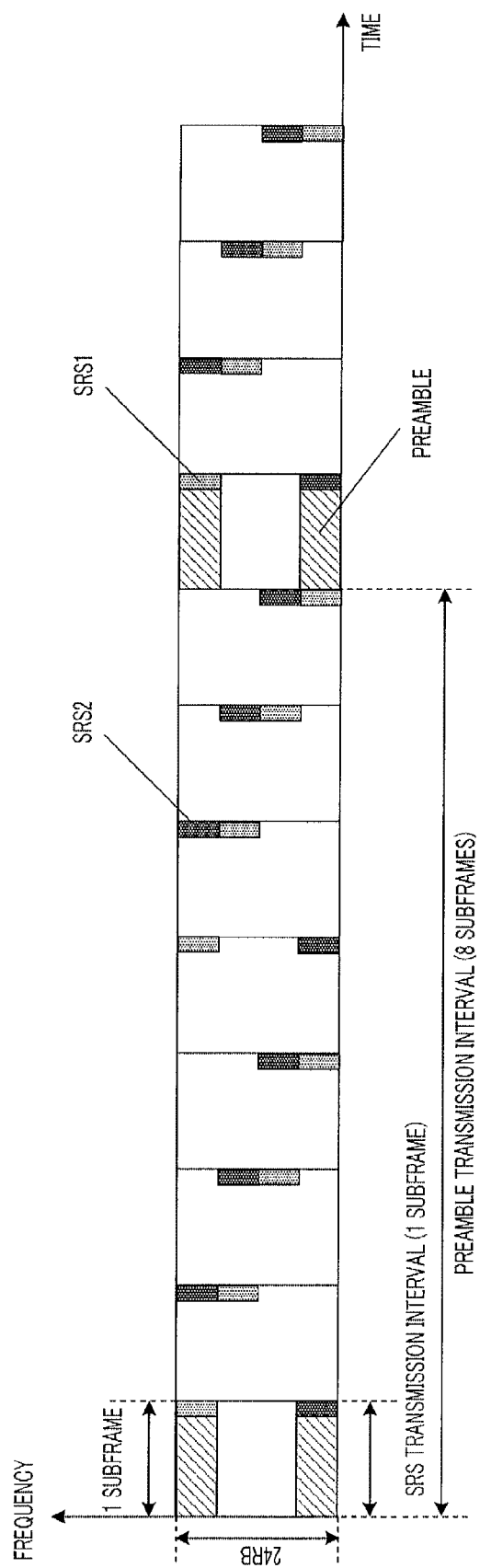
FIG. 10 is a diagram illustrating another association of a transmission time field of the present invention (first example of association)

Furthermore, a case has been described with the present embodiment where there is one SRS in the transmission time field in which the preamble and the SRS match each other, but the present invention is also applicable to a case where there are a plurality of SRSs in the transmission time field in which the preamble and the SRS match each other. For example, as shown in FIG. 10, when SRS 1 and SRS 2 are arranged in different transmission bands in the same transmission time field, a transmission band that matches that of the preamble may be given to SRS 1 and SRS 2 evenly. To be more specific, as shown in FIG. 10, in the preamble transmission time field, both transmission bands of SRS 1 and SRS 2 are made to match two different preamble transmission bands respectively. This allows the effect of the present invention resulting from the match between the preamble and the SRS transmission fields to be given to a plurality of SRSs evenly. Moreover, the influence of interference resulting from the match between the preamble and the SRS transmission fields can also be distributed evenly over a plurality of SRSs.

Figure 11:
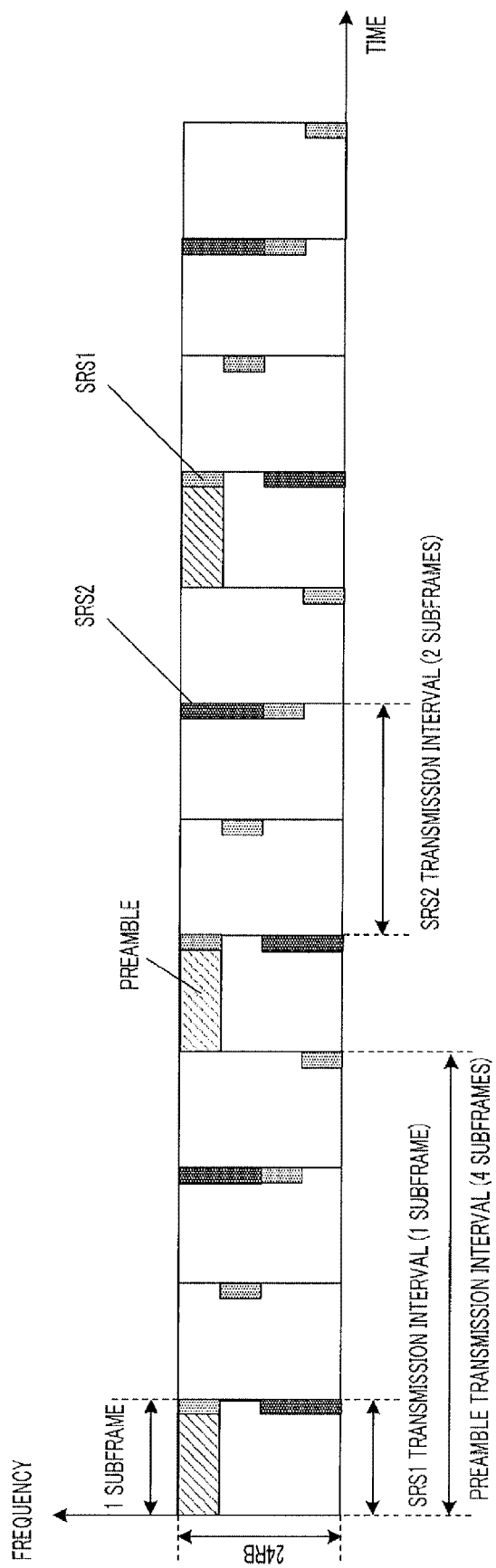
FIG. 11 is a diagram illustrating a further association of a transmission time field of the present invention (second example of association).

Furthermore, when there are a plurality of SRSs in the transmission time field in which the preamble and the SRS match each other, a transmission field that matches that of the preamble may be preferentially assigned to only a specific SRS. For example, as shown in FIG. 11, the SRS having the smallest transmission bandwidth (SRS 1 shown in FIG. 11) of a plurality of SRSs (SRS 1 and SRS 2 shown in FIG. 11) may be designated as a specific SRS. Thus, for an SRS having a small transmission bandwidth (SRS of a narrowband), it is possible to improve the accuracy of CQI estimation using a preamble as an SRS. For example, SRS 1 may be assigned to a mobile station located at a cell edge, which has a small system bandwidth and which requires improvement of the accuracy of CQI estimation. Here, when a preamble is used as an SRS, the base station indicates the code sequence to use as the preamble to the mobile station in advance. This eliminates collision between preambles from different mobile stations at the base station and allows the base station to use preambles in the same way as SRSs to be subjected to CQI estimation.

Embodiments of the present invention have been explained so far.

In the embodiments above, a preamble is associated with an SRS using equation 1. However, with the present invention, it is equally possible to associate a preamble with an SRS by making m and n in following equation 1 unequal. For example, the relationship m≦n may be assumed between m and n in equation 1. That is, a preamble and SRS may be associated to constantly satisfy the relationship: preamble transmission time interval≧SRS transmission time interval.

Furthermore, the association rules in the embodiments above may be changed according to the system bandwidth. For example, the 3GPP RAN LTE is studying 1.25/2.5/5/10/15/20 MHz for the system bandwidth. Thus, the preamble and SRS association rules may be changed for each of the above-described system bandwidths. This allows the rate at which the preamble and SRS transmission fields match each other to be set to an optimum rate for each system bandwidth. Here, the smaller the system bandwidth, the smaller the amount of communication resources available. Therefore, by increasing the rate at which the preamble and SRS transmission time fields match each other as the system bandwidth decreases, it is possible to provide greater effect of reducing SRS communication resources.

Furthermore, the embodiments above may adopt a configuration for determining whether or not to transmit the SRS in the preamble transmission field according to the cell radius and how often the SRS is transmitted. Especially, applying the present invention to only a case where the cell radius is small allows transmission and reception without interference between preambles and SRSs. Here, the "cell of a small cell radius" refers to a cell that satisfies following equation 3.

$$\text{Max}.RTD \leq GT - (CP + SRS) \quad \text{(Equation 3)}$$

where Max.RTD denotes the maximum RTD of the cell.

Furthermore, the embodiments above may also adopt a configuration in which the mobile station determines whether or not to transmit an SRS in the preamble transmission time field according to the distance between the base station and the mobile station estimated from a path loss level of a received signal. For example, when the distance between the base station and the mobile station is small, the mobile station transmits an SRS in the preamble transmission time field. This allows the base station to prevent interference between the preamble and the SRS. On the other hand, when the distance between the base station and the mobile station is large, the mobile station does not transmit any SRS in the preamble transmission time field. This allows the preamble to be transmitted without interference in the preamble transmission time field. In this case, even if the mobile station does not transmit any SRS, the base station may judge that the channel quality (CQI) is very low because the distance between the base station and the mobile station is large. This makes CQI estimation unnecessary, preventing frequency scheduling using CQI estimate values from being affected.

Furthermore, a case has been described above in the embodiments above where a preamble and an SRS are transmitted from different mobile stations, but when the preamble and the SRS have the same transmission time field from one mobile station, the preamble and the SRS may be transmitted simultaneously. For example, the mobile station may arrange an SRS in a guard time of a preamble to be transmitted in the preamble transmission field that matches the SRS transmission field and simultaneously transmit the preamble and the SRS arranged in the guard time of the preamble.

Furthermore, in the embodiments above, code sequences may be used which have a small cross-correlation between a code sequence used as a preamble and a code sequence used as an SRS. This allows the base station to reduce interference between the preamble and the SRS caused by a delay of the preamble reception timing.

Furthermore, a case has been described with the present embodiment where a preamble is transmitted, but similar effects can also be obtained by applying the present invention to a signal with a guard time set in the transmission time field and transmitted periodically by the mobile station to the base station.

Furthermore, a case has been described with the present embodiment where an SRS is transmitted, but similar effects can also be obtained by applying the present invention to signals transmitted periodically from the mobile station to the base station.

Moreover, although cases have been described with the embodiments above where the present invention is configured by hardware, the present invention may be implemented by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No.2007-207187, filed on Aug. 8, 2007, including the specification, drawings and abstract, is incorporated herein by reference in its entirety.

INDUSTRIAL APPLICABILITY

The present invention is applicable to a mobile communication system or the like.

The invention claimed is:

1. A mobile station apparatus comprising:
a mapping unit configured to map a Sounding Reference Signal (SRS) to a position of a guard time in a subframe, in which a random access preamble is transmitted, the guard time during which nothing is transmitted being added to the last of the random access preamble, and a cyclic prefix being added to the beginning of the random access preamble; and
a transmitting unit configured to transmit the mapped SRS, wherein the random access preamble is a preamble sequence selected from a set of preamble sequences, and wherein the guard time is of a given time length.

2. The mobile station apparatus according to claim 1, wherein the guard time is added to the last of the random access preamble, and said mapping unit maps the SRS in the last of the subframe.

3. The mobile station apparatus according to claim 1, wherein said mapping unit maps the SRS such that a time gap between the SRS and the random access preamble is maximized.

4. The mobile station apparatus according to claim 1, wherein the random access preamble is transmitted from a mobile station apparatus, which is non-synchronized in an uplink.

5. The mobile station apparatus according to claim 1, wherein the random access preamble is transmitted from another mobile station apparatus.

6. The mobile station apparatus according to claim 1, wherein said transmitting unit transmits the SRS at a constant period.

7. The mobile station apparatus according to claim 6, wherein the period is defined by a number of subframes.

8. The mobile station apparatus according to claim 1, wherein said transmitting unit transmits the SRS at a period, which is m/n times of a period at which a random access preamble is transmitted, wherein m and n are positive integers.

9. The mobile station apparatus according to claim 1, wherein said transmitting unit transmits the SRS at a constant period in at least part of subframes in which random access preambles are transmitted.

10. The mobile station apparatus according to claim 1, wherein said transmitting unit transmits the SRS at a constant period in subframes including a subframe, in which a random access preamble is transmitted.

11. The mobile station apparatus according to claim 1, wherein said transmitting unit transmits the SRS using frequency hopping.

12. The mobile station apparatus according to claim 1 further comprising a receiving unit configured to receive control information related to a time resource of the SRS, wherein said transmitting unit transmit the SRS based on the control information.

13. A transmitting method comprising:
mapping a Sounding Reference Signal (SRS) to a position of a guard time in a subframe, in which a random access preamble is transmitted, the guard time during which nothing is transmitted being added to the last of the random access preamble, and a cyclic prefix being added to the beginning of the random access preamble; and
transmitting the mapped SRS,
wherein the random access preamble is a preamble sequence selected from a set of preamble sequences, and wherein the guard time is of a given time length.

* * * * *